United States Patent
Mimatsu et al.

(10) Patent No.: US 6,694,413 B1
(45) Date of Patent: Feb. 17, 2004

(54) COMPUTER SYSTEM AND SNAPSHOT DATA MANAGEMENT METHOD THEREOF

(75) Inventors: Yasuyuki Mimatsu, Fujisawa (JP); Naoto Matsunami, Sagamihara (JP); Kenji Muraoka, Odawara (JP); Takashi Oeda, Sagamihara (JP); Ikuya Yagisawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 477 days.

(21) Appl. No.: 09/652,283

(22) Filed: Aug. 30, 2000

(30) Foreign Application Priority Data

Apr. 19, 2000 (JP) ......................................... 2000-118012

(51) Int. Cl.$^7$ .......................... G06F 12/00; G06F 13/00
(52) U.S. Cl. ..................... 711/162; 711/114; 711/165; 707/204
(58) Field of Search ................................. 711/114, 161, 711/162, 165; 707/204; 386/71, 119

(56) References Cited

U.S. PATENT DOCUMENTS

| | | | |
|---|---|---|---|
| 5,051,887 A | 9/1991 | Berger et al. ................ 364/200 |
| 5,649,152 A | 7/1997 | Ohran et al. ................. 395/441 |
| 5,845,295 A | 12/1998 | Houseman et al. .......... 707/204 |
| 6,085,298 A | * 7/2000 | Ohran ......................... 711/162 |
| 6,101,585 A | * 8/2000 | Brown et al. ................ 711/162 |
| 6,182,198 B1 | * 1/2001 | Hubis et al. ................. 711/162 |
| 6,473,775 B1 | * 10/2002 | Kusters et al. .............. 707/200 |

* cited by examiner

Primary Examiner—Jack A. Lane
Assistant Examiner—Pierre M. Vital
(74) Attorney, Agent, or Firm—Townsend and Townsend and Crew LLP

(57) ABSTRACT

A method of managing snapshot data of a computer system provided with a computer and a storage subsystem coupled to the computer, and the computer system to which the method is applied, are disclosed. The storage subsystem is provided with the duplicated first and second storage units. In the state in which they are duplicated, when a request to update data is issued to the first storage unit, the storage subsystem writes the same updated data onto the second storage unit. When an acquisition of the snapshot is requested by the computer at any time, the storage subsystem suspends the writing of the writing data for the first storage unit onto the second storage unit thereafter. When the writing of the data onto the first storage unit occurs, the computer holds the location of writing the data as differential information. When making the contents of the first storage unit and the second storage unit the same, the data written onto the first storage unit after the acquisition of the snapshot is requested is written onto the second storage unit.

23 Claims, 10 Drawing Sheets

| LU | Mirroring destination LU | Mode |
|---|---|---|
| 1 | 4 | Synchronized |
| 2 | 5 | In snapshot |
| 3 | 6 | Re-synchronizing |
| | | |

| LU | Update part starting LBA | Update part stopping LBA |
|---|---|---|
| 2 | 0 | 15 |
| 2 | 256 | 511 |
| 3 | 8 | 31 |
| | | |

FIG.4

| Page code 00h |
|---|
| Mode |

FIG.9
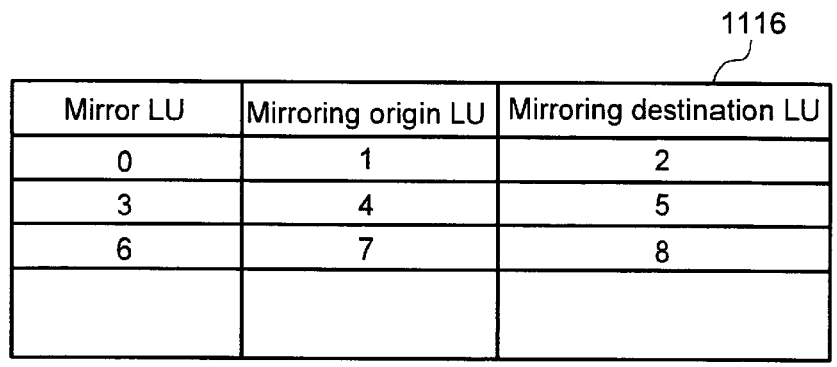
| Mirror LU | Mirroring origin LU | Mirroring destination LU |
|---|---|---|
| 0 | 1 | 2 |
| 3 | 4 | 5 |
| 6 | 7 | 8 |
|   |   |   |
1116
FIG.10
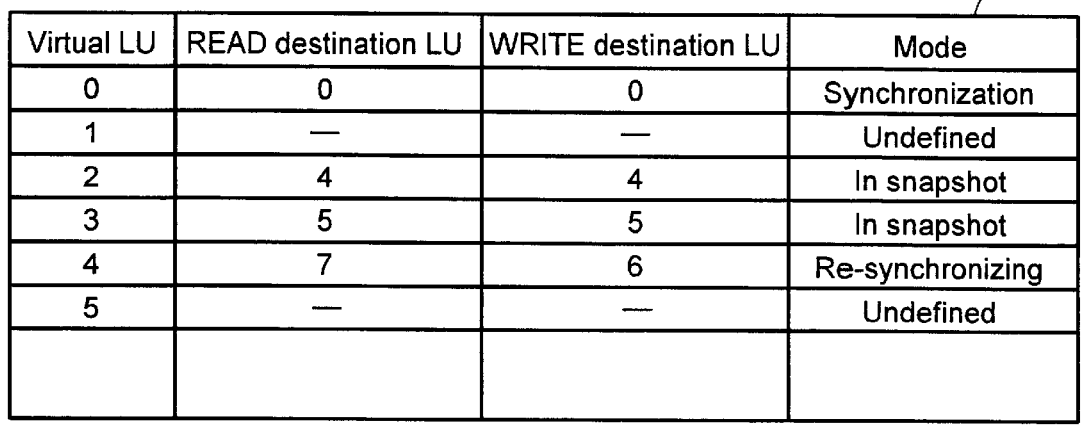
408
| Virtual LU | READ destination LU | WRITE destination LU | Mode |
|---|---|---|---|
| 0 | 0 | 0 | Synchronization |
| 1 | — | — | Undefined |
| 2 | 4 | 4 | In snapshot |
| 3 | 5 | 5 | In snapshot |
| 4 | 7 | 6 | Re-synchronizing |
| 5 | — | — | Undefined |
|   |   |   |   |
FIG.11
| Page code 00h |
|---|
| Classification |
| Mirroring origin LU |
| Mirroring destination LU |

FIG.14

| Mirroring LU | Mirroring destination |
|---|---|
| 0 | 1 |
| 2 | 3 |
| 4 | 5 |
| | |

COMPUTER SYSTEM AND SNAPSHOT DATA MANAGEMENT METHOD THEREOF

BACKGROUND OF THE INVENTION

The present invention relates to a data management system and method in a storage subsystem and a computer system. In particular, the invention relates to a snapshot management method of an external storage unit necessary for the backup of the data of the external storage unit for which high availability is required. It also relates to a computer system having a storage subsystem controlled by the above management method.

Generally, in computer systems backup copies of data are made periodically on other recording medium such as magnetic tape to provide reliability in case of loss of the data recorded in storage units caused by equipment failure, natural disaster, a software error, incorrect operation, etc. If the data in the storage unit is lost, the original data can be recovered using the back up data. When acquiring a backup, if the data is updated during a copying operation to acquire the backup, inconsistency of the copied data will be caused. Therefore, prevention of data update during the copying operation must be assured.

To avoid corrupting the data being copied for the backup operation, suspension of operation of all the programs except the backup program which accesses the data suffices. In a system required for high availability, however, the program cannot be suspended for a long time. Therefore, a mechanism which allows updating the data during backup operations, and records the state of the data at the time of the start of the backup is necessary.

The fixed image of data at a certain time point is known as a snapshot. A mechanism which allows the data to be updated while maintaining the snapshot is called a snapshot management method. Taking a snapshot using the snapshot management method is called an acquisition of snapshot. The object data from which the snapshot is taken is called original data. A conventional snapshot management method is realized by storing the pre-updated data, duplicated using the computer or an external storage unit. One approach to conventional snapshot management is as follows.

(1) Method of Storing the Pre-updated Data

U.S. Pat. No. 5,649,152 describes one method of snapshot management. In this technique, if the update of the original data occurs after the time of acquisition of the snapshot, the memory contents before the update are stored in a different memory area. The snapshot is then logically accessed as different data independent of the original data. After the acquisition of the snapshot data, the snapshot shares the memory area with the original data as to the part of the original data not updated. For the updated original data, the contents of the memory before the update are stored in another area.

(2) Method of Duplicating Data by a Computer

In another method of duplicating data by a computer, a program on the computer stores all the data in two areas duplicating (mirroring) the data. When acquiring the snapshot, the program stops the duplicating operation, separating the two memory areas to independent regions, and provides one area as the original data and another as the snapshot. Such method of snapshot management is disclosed, for example, by U.S. Pat. No. 5,051,887.

(3) Method by Means of Duplicating Data by an External Storage Unit

As disclosed in U.S. Pat. No. 5,845,295, for example, snapshot management is executed using the procedure of (2) above inside the external storage unit instead of using the program in the computer. The entire function for managing the snapshot is provided by the snapshot management program inside the external storage unit.

SUMMARY OF THE INVENTION

In the prior art above, by means of the storage of pre-updated data, accesses to the snapshot and to the original data both refer to the same memory area with respect to the original non-updated data. Therefore, the accesses are concentrated at specific recording media, and the input/output performance of the disk drive is diminished. In this technology, both the accesses to the original data and to the snapshot are done via the snapshot management program. Therefore, during the backup, the load on the computer executing the snapshot management program increases. This may impact the execution speed of other programs, such as database programs. In backing up a large amount of data, the performance deteriorates for a long time until the backup operation is completed.

In one of the methods, the snapshot management program writes data on two logical storage units. Thus twice as many executions of the write operation as those of the system without the snapshot management are required. Therefore, in the prior art, the load on a CPU of the computer executing the data writing, the amount of data communication through communication paths connecting the computer and the external storage units, and the load on the disk controller of the external storage units increase. For this reason, the execution speed of each application program is slower compared to that in a system without snapshot management. The deterioration of performance is conspicuous with the processes involving an update of a large amount of data, for example, replication of a database.

In the method where the external storage unit duplicates the data, all the processing necessary for the snapshot management is installed in the external storage unit, so that the control programs of the external storage unit become complicated. The period required for development of the control program becomes longer, and thus its complexity, debugging and cost rise.

The present invention solves such problems of the prior art and provides a snapshot management method which prevents concentration of the load on specific memory media of the external storage unit and prevents the increase of load on the CPU in which the snapshot of the external storage has been acquired. Furthermore, it alleviates the load on the CPU of the computer, the amount of communication through the communication paths, and the load on the external storage unit in the mode in which the snapshot of the external storage has not been acquired.

Another benefit of the present invention is to provide a computer system which is able to execute snapshot management of the external storage device using an inexpensive external storage unit having comparatively simple functions.

The present invention provides a method for managing the snapshot data in a computer system having a computer and a storage unit system connected to it and the computer system to which the method is applied. The storage unit system is equipped with the first and the second storage units which are to be duplicated. In the state in which they are duplicated, when a data update request is issued to the first storage unit, the storage unit system also writes the same updated data on the second storage unit. When acquisition of the snapshot is requested from the computer, the storage unit system interrupts writing data to be written on the first storage unit on the second storage unit. When writing data on the first storage unit occurs, the computer holds the writing location as differential information. When making the contents of the first storage unit and the second storage unit the same, the data written on the first storage unit after the acquisition of the snapshot was requested is written on the second storage unit according to the differential information held in the computer. In one form of the present invention, the processing to make the contents of the first storage unit and those of the second storage unit the same is executed in the way that the computer reads the data from the first storage unit according to the differential information, and then instructs the storage unit system to write the data. In another form of the present invention, the processing to make the contents of the first storage unit and those of the second storage unit is executed in the way that the computer acquires the storage locations of the data to be made to be the same according to the differential information, and then instructs the storage unit to copy the data specifying the storage locations. In response to the copying instruction, the storage unit system reads out the data from the specified storage locations in the first storage unit and copies the data to the second storage unit.

The further features and the effects of the present invention will be understood by the following detailed explanations and drawings on the present invention.

BRIEF DESCRIPTION OF THE DRAWINGS

FIG. 2 is a conceptual drawing showing the form of the mirroring management table.

FIG. 3 is a conceptual drawing showing the form of the update location management table.

FIG. 4 is a conceptual drawing explaining the contents of a parameter page used for Mode Select and Mode Sense.

FIG. 9 is a conceptual drawing showing the form of the mirroring definition table.

FIG. 10 is a conceptual drawing showing the form of the LU mode table.

FIG. 11 is a conceptual drawing showing the contents of a parameter page to be returned to the Mode Sense command.

FIG. 14 is a conceptual drawing showing the configuration of the mirroring definition table.

DESCRIPTION OF THE SPECIFIC EMBODIMENTS

Figure 1:
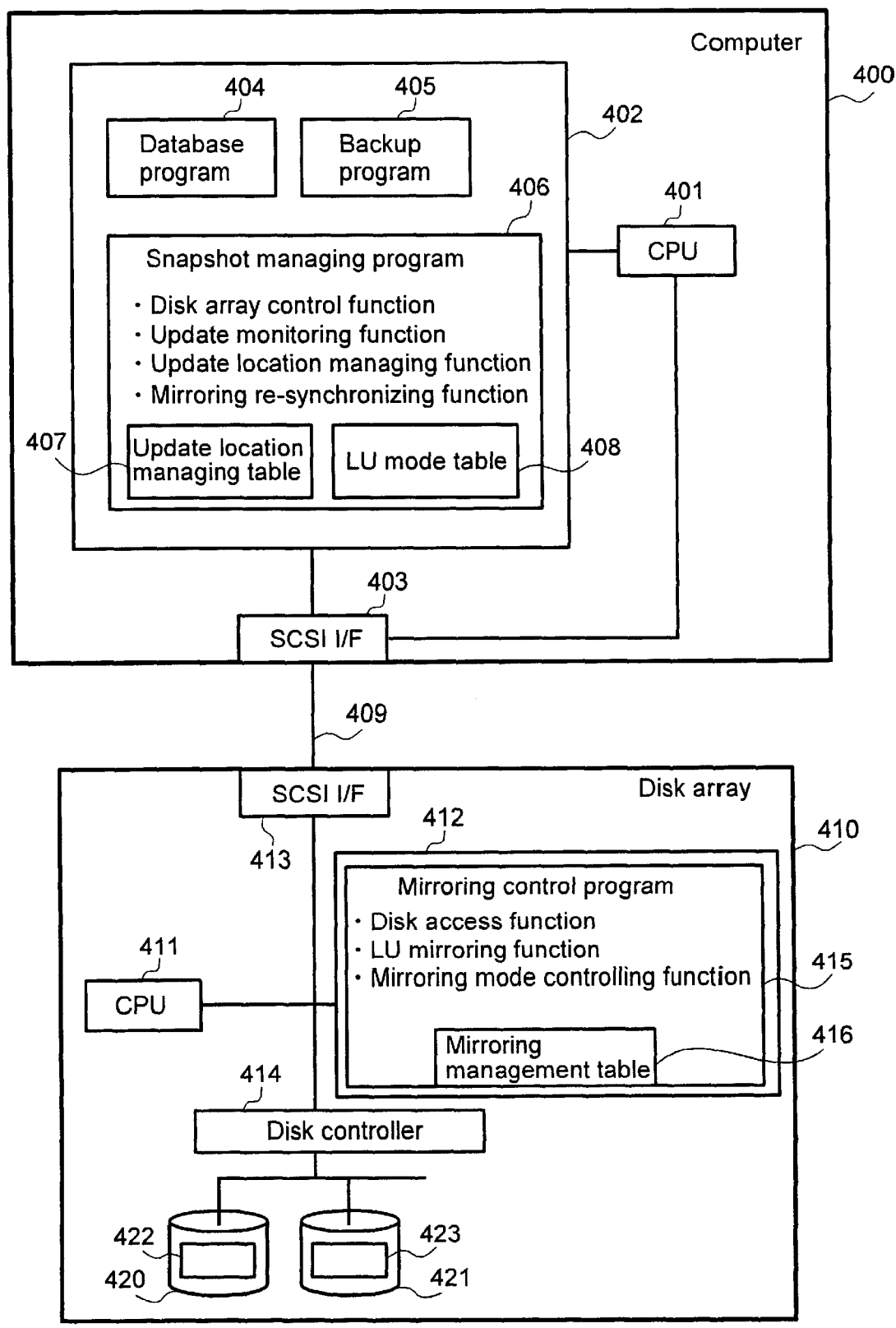
FIG. 1 is a simplified block diagram showing the configuration of the computer system of a first preferred embodiment of the present invention.

FIG. 1 is a block diagram of the configuration of a computer system in which the snapshot management of the first preferred embodiment of the present invention is executed. The first preferred embodiment of the present invention relates to the snapshot management in the case of executing the online backup of a storage area being accessed by a database program in parallel with the database processing. In FIG. 1, the computer 400, CPU's 401 and 411, memories 410 and 412, SCSI interfaces 403 and 413, a database program 404, a backup program 405, a snapshot program 406, an update location management table 407, an LU mode table 408, an SCSI bus 409, a disk array 410, a disk controller 414, a mirroring control program 415, a mirroring management table 416, disk units 420 and 421, and logical units (LU's) 422 and 423 each of which is logically managed as a disk unit are illustrated.

The computer 400 and the disk array 410 are connected by the SCSI bus 409 via the interfaces 403 and 413. In the memory 402 inside the computer 400, the database program 404, the backup program 405, and the snapshot management program 406 which are executed by the CPU 401 controlling the computer 400 are stored. The disk units 420 and 421 which are controlled by the disk controller 414 are provided in the disk array 410. The mirroring control program 412 which is executed by the CPU 411 is stored in the memory 412. The storage areas inside each of the disk units 420 and 421 are accessed by the computer 400 as the logical units (LU's) 422 and 423 of SCSI.

While being executed, the database program 404 accesses the LU 422 and stops and restarts the update of the data on the disk according to the user's instruction. The backup program 405 executes a reading out of data for a backup from the LU 423 according to the instruction by the user. The snapshot management program 406 is a middleware like the device driver and the volume manager. All the disk access requests issued by the database program 404 to the disk array 410 are issued to the disk array 410 via the snapshot management program 406. The snapshot management program 406 has the update location management table 407 and the LU mode table 408, and realizes the disk array control function, update monitoring function, update location management function, and mirroring re-synchronizing function.

The mirroring control program 415 of the disk array 410 has the LU mirroring function which writes the same data on another predetermined LU by duplicating an update of the one LU in addition to the disk access function which instructs the disk controller 414 to access a disk in obedience to a request from the computer 400. Here, explanations will be made on the assumption that an update of the LU 422 is duplicated and applied to the LU 423. Those are functions that the conventional disk array has. Besides, the mirroring control program 415 has the mirroring mode control function to make each of the duplicated two LU's an accessible independent LU by invalidating the LU mirroring function.

The definition and the current mode of the mirroring mate LU of each LU to be duplicated are recorded in the mirroring management table 416. FIG. 2 is a drawing showing the form of the mirroring management table. The mirroring mate LU and its mode for each LU to be duplicated are recorded in the mirroring management table 416. The mode includes three types of them which are "Synchronized" in which contents of both LU's are the same, "Snapshot" in which each of the LU's can be accessed as an independent LU, and "Re-synchronized" in which the data which are not the same between the LU's are being copied to change the mode from the "Snapshot" to the "Synchronized". The LU mirroring function is applied to the LU in the mode of "Synchronized" or "Re-synchronized". By the setting of the two or more mirroring mate LU's, a multiple configuration of treble or more can be formed.

The snapshot management program 406 has, as described later, the disk array control function which issues the Mode Sense and Mode Select commands of SCSI (Small Computer System Interface), the update monitoring function which detects the update of the original data requested by the database program after the acquisition of the snapshot, the update location management function which records the location of the update, and the mirror re-synchronizing function which copies the updated part of the original data to the mirroring mate LU when the snapshot is deleted. The update monitoring function and the update location management function are applied to the LU in the mode of "Snapshot" or "Re-synchronized" and the mirror re-synchronizing function is applied only to the LU in the mode of "Re-synchronized." The LU mode table 408 which records the current mode of each LU has the form of the mirroring management table 416 of the disk array shown in FIG. 2 from which the definition of the mirroring mate LU has been omitted. The LU mode table 408 is produced by the snapshot management program 406 when it issues the Mode Sense commands to all the accessible LU's and acquires the mode of each LU from the disk array 410 at the time when it is activated.

The update location of the original data after the acquisition of the snapshot is recorded in the update location management table 407. FIG. 3 is a drawing showing the form of the update location management table. The LU which stores the updated original data, the first logical block address (LBA) of the update location, and the last LBA of the update location are recorded in the update location management table. The update location management table shown in FIG. 3 shows that the parts which are the LBA's 0 to 15 and the LBA's 256 to 511 of the LU 2, and the LBA's 8 to 31 of the LU 3 have been updated after the acquisition of the snapshot. The record in the update location management table 407 indicates the location where the contents of the two LU's which are defined as the duplicated pair are not the same.

Next, the control of the disk array from the computer in a computer system with above-mentioned configuration in the preferred embodiment will be explained as follows. All the operation of the mirroring control program of the disk array for each LU such as validating/invalidating the LU mirroring function and permitting/rejecting access to the mirroring mat LU are decided according to the mode of the LU recorded in the mirroring management table. The mirroring control program 415 changes the mode recorded in the mirroring management table 416 to that specified by the Mode Select command issued by the snapshot management program 406. The mirroring control program 415 returns the current mode record of the specified LU when it receives the Mode Sense command which requires the contents of the mirroring management table 416. FIG. 4 shows the contents of a parameter page used for the Mode Select and Mode Sense commands. The parameter page comprises 2 bytes; a page code (00h) is specified at the top and the second byte indicates the mode of the specified LU. In the Mode Select command, one of 0, 1 and 2 is set as the mode corresponding to the "Synchronized", "Snapshot" and "Re-synchronized" respectively. When the Mode Sense command is executed, current mode is returned, however, if the LU specified by the Mode Sense command is not duplicated or defined as the mirroring mate LU, "4" is returned as "Undefined".

Next, the acquisition of the snapshot will be explained for the case of acquiring the snapshot of the LU 422 as an example. In the case of acquiring the snapshot, the user stops an update of the database temporarily to assure the consistency of the data to be backed up. Then, the user instructs the snapshot management program to acquire the snapshot of the LU 422. The snapshot management program 406 refers to the LU mode table 408 and ascertains that the mode of the LU 422 is the "Synchronized". When doing that, if there is no record of LU 422 in the LU mode table or the mode is not the "Synchronized", the snapshot management program 406 discontinues the processing.

When the mode of the LU 422 is the "Synchronized", the snapshot management program 406 changes the mode recorded in the LU mode table 408 from "Synchronized" to "Snapshot" and validates the update monitoring function and the update location management function. Then, the snapshot management program 406 issues the Mode Select command to change the mode of the LU 422 recorded in the mirror management table 416 inside the disk array 410 to "Snapshot". When the mirror control program 415 inside the disk array 410 receives the Mode Select command, it changes the mode of the LU 422 recorded in the mirror management table 416 to "Snapshot". Then, the user restarts the update of the database.

The operation of the mirroring control program 415 for each LU, that is, the control on reading/writing of data, is decided according to the modes of the LU as explained later. This change of the modes enables the LU 423 which is the destination of the mirroring mate LU to be accessed by a computer as an independent LU. Besides, since the update of the LU 422 is not reflected on the LU 423, the backup program 405 can use the LU 423 as the snapshot of the LU 422.

Next, the deletion of the snapshot will be explained for the case of deleting the snapshot of the LU 422 as an example. In the case of deleting the snapshot, the user instructs the snapshot management program 406 to delete the snapshot of the LU 422. The snapshot management program 406 refers to the LU mode table 408 and ascertains that the mode of the LU 422 is the "Snapshot". The snapshot management program 406 discontinues the processing if there is no record of the LU 422 in the LU mode table 408 or the mode is not the "Snapshot". When the mode of the LU 422 is the "Snapshot", the snapshot management program 406 issues the Mode Select command to change the mode of the LU 422 recorded in the mirroring management table 416 inside the disk array 410 to the "Re-synchronized". This change of the mode makes the access from the computer destination of which is the LU 423 impossible. Thereafter, the LU mirroring function is validated and the update of the LU 422 is reflected on the LU 423.

The snapshot management program 406 changes the mode of the LU 422 recorded in the LU mode table 408 to the "Re-synchronized" and validates the mirroring re-synchronizing function. The details of the data copying processing performed by the mirroring re-synchronizing function will be explained later. When the data copying is completed, the snapshot management program 406 issues the Mode Select command which instructs the "Synchronized" and changes the mode recorded in the LU mode table 408 to the "Synchronized". The mirroring control program 415 of the disk array 410 changes the mode of the LU 422 recorded in the mirroring management table 416 to the "Synchronized" in obedience to the Mode Select command. Through the above-mentioned processings, the update monitoring function, the update location management function, and the mirroring re-synchronizing function of the snapshot management program for the LU 422 are invalidated and the deletion of the snapshot is completed.

The following is an explanation of the data read out processing that is the reading out of the data in the LU 422 and the LU 423 of the disk array by the database program 404 and the backup program 405 on the computer 400 respectively. The input/output request from the program inside the computer 400 is issued via the snapshot management program 406. In the case where the input/output request is a reading request, the snapshot management program transfers the READ command of SCSI to the disk array. When the mirroring control program 415 of the disk array receives the READ command, it reads out data from the designated LU and returns the data and the status to the computer 400. When doing this, if the mode of the designated LU is the "Synchronized", the load is scattered by means of reading out from either the designated LU and mirroring mate LU because contents of the two LU's are the same. In the case where the designated LU is the mirroring mate LU and its mode is not the "Snapshot", the mirroring control program 415 rejects the access and returns an error status. The access to the mirroring mate LU, which is not in the mode of the "Snapshot" including the writing, may be rejected inside the snapshot management program 406.

Figure 5:
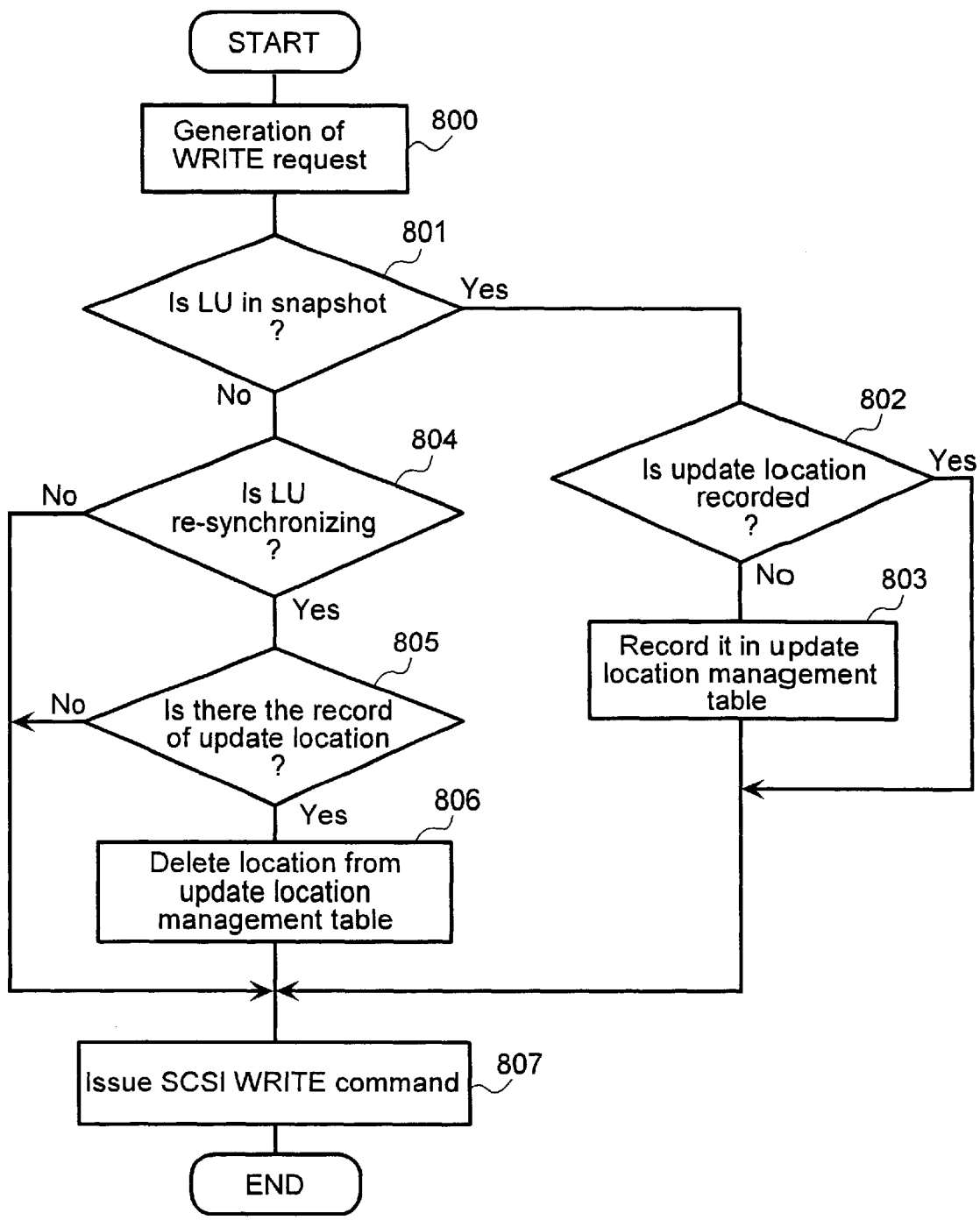
FIG. 5 is a flowchart explaining the data writing operation of the snapshot management program.

FIG. 5 is a flowchart explaining the operation of data writing of the snapshot management program. This processing is executed when the database program 404 and the backup program 405 update the storage contents of the LU 422 and the LU 423 respectively.

When the snapshot management program 406 receives the writing request from the programs 404 and 405 (step 800), it ascertains whether the mode of the LU access destination LU is the "Snapshot" or not (step 801) by referring to the LU mode table 408. When the mode of the access destination LU is found to be the "Snapshot" as the result of judgment in the step 801, the snapshot management program 406 checks whether the update location of the access destination which is to be updated by the writing request has already been recorded in the update location management table 407 (step 802). If the update location of the accessing destination is not recorded on the update location management table 407, it records the location in the update location management table 407 and issues the WRITE command of SCSI. If it is already recorded, the program issues the WRITE command of SCSI leaving it as it is (steps 803 and 807).

If the mode of the LU is found to be not the "Snapshot" as the result of judgment in the step 801, the snapshot management program 406 further ascertains whether it is the "Re-synchronized" or not (step 804). Since the mode of the access destination LU is the "Synchronized" if the mode of the LU is not the "Re-synchronized", the program goes to step 807 leaving it as it is and issues the WRITE command. When the mode of the LU is found to be the "Re-synchronized" as the result of the judgment in step 804, the snapshot management program 406 checks further whether the update location to be accessed by the WRITE command is recorded in the update location management table 407 or not (step 805). If the information concerned is not recorded, the program issues the WRITE command leaving it as it is. If the information on the update location is recorded, the program issues the WRITE command after deleting the concerning information on the update location from the update location management table 407 (steps 806 and 807).

When adding the information on the update location in the update location management table 407 in the above-mentioned processing, the information is added in the way that no multiple information including the same update location exists. When deleting the information of the update location from the update location management table 407, the update location management table 407 is amended in the way that no information other than that on the update location which is the object of the deletion is deleted. For example, the deletion of the information on the LBA=10 to 11 of the LU 3 from the table is assumed when the update location management table 407 has the contents shown in the FIG. 3. In this case, the LBA=8 to 31 of the LU 3 recorded in the update location management table 407 are deleted and an entry having the information on the LBA=8 to 9 and the LBA=12 to 31 is newly added.

Figure 6:
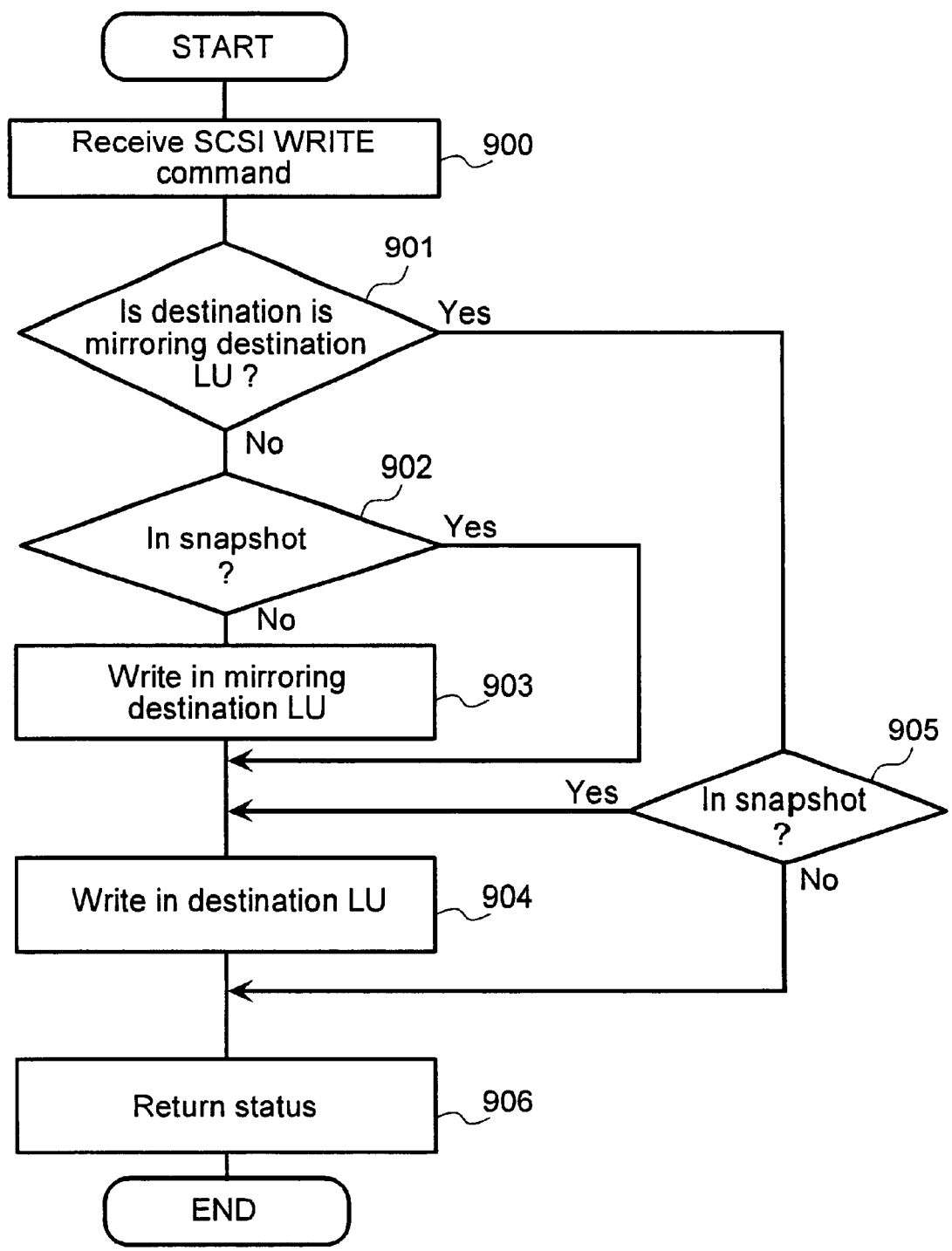
FIG. 6 is a flowchart explaining the operation of the mirroring control program when it receives a write command from a computer.

FIG. 6 is a flowchart explaining the operation of the mirroring control program which has received the WRITE command from the computer. When the mirroring control program 415 receives the WRITE command (step 900), it checks whether the access destination LU has been set as the mirroring mate LU or not (step 901) by referring to the mirroring management table 416. If the access destination is found to be the mirroring mate LU as the result of the judgment in the step 901, the mirroring control program 415 checks whether the mode is the "Snapshot" or not (step 905). If the mode of the LU is the "Snapshot", the program writes data on the LU designated in the step 904. If the mode of the LU is not the "Snapshot", the program returns the write failure status in the step 906 because the LU designated as the access destination cannot be accessed as an independent LU.

In the case where the access destination LU is not the mirroring mate LU, the mirroring control program 415 ascertains whether the mode of the LU is "Snapshot" or not (step 902). If the mode of the LU is not "Snapshot", the program goes to step 904 after writing data on the LU designated as the mirroring mate LU (step 903). The mirroring control program 415 writes the data on the LU designated in the step 904 and returns the status of the command execution to the computer 100 in the step 906.

In the processing of the snapshot management program 406 explained above, the reason for deleting the record in the update location management table 407 when the LU to be updated is in the "Re-synchronized" mode and the update location to be accessed by the write request is recorded in the update location management table 407 is to avoid the waste of data copying processing executed in the LU re-synchronizing processing at the time of the snapshot deletion which will be explained later. In the mode of "Re-synchronized", the LU mirroring function of the mirroring control program 415 is valid. Therefore, when the data update is generated, the contents of the updated part of the LU is reflected on the mirroring mate LU and the both contents are the same. Thus, the data copying processing for the re-synchronization is not necessary. Since, the data copying for the re-synchronization is executed for the updated location recorded in the update location management table 407 to be explained later, the record of the location wherein both contents are the same is deleted from the update location management table 407.

Figure 7:
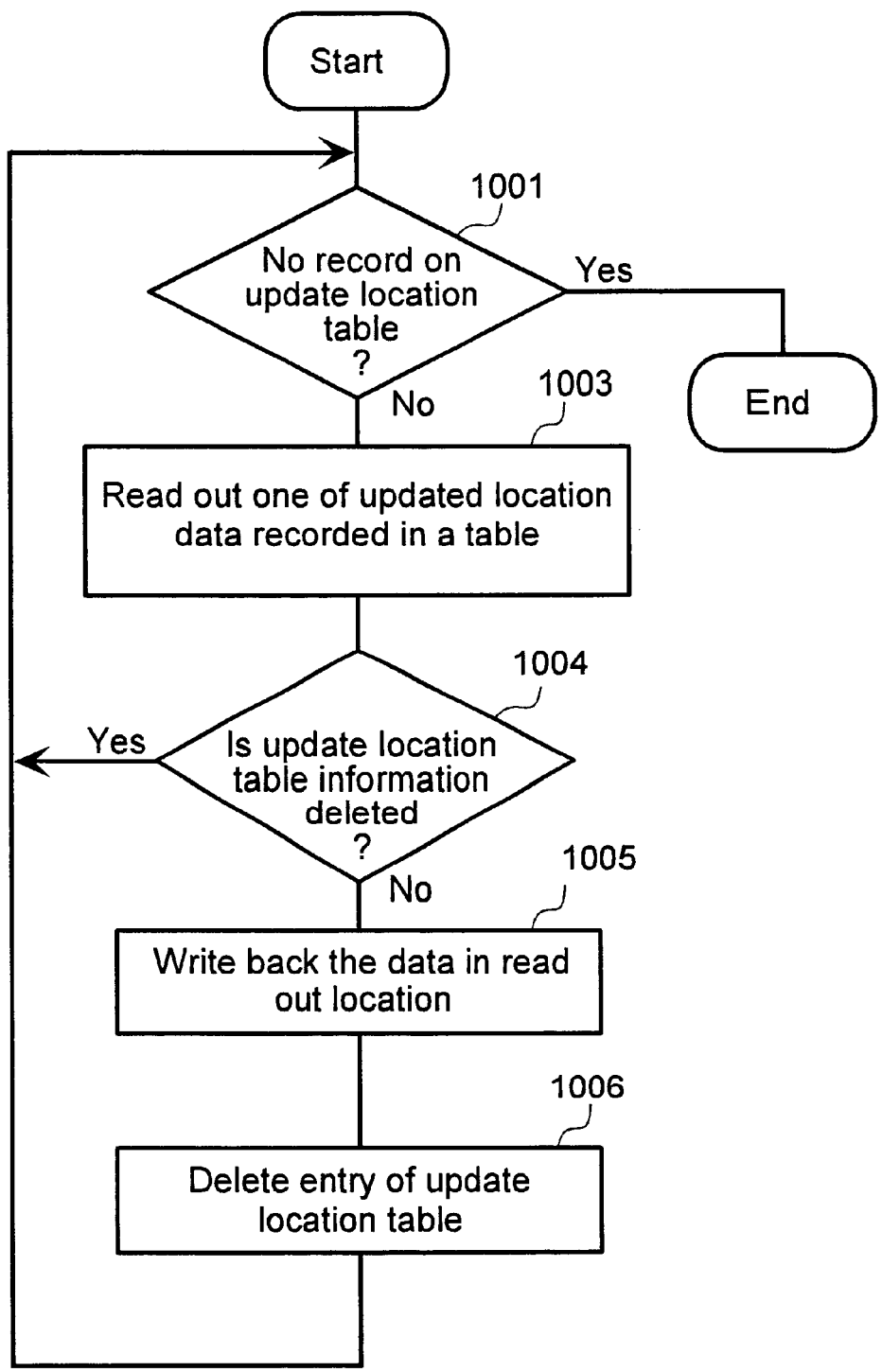
FIG. 7 is a flowchart showing the operation of the mirroring re-synchronizing function of the snapshot management program.

FIG. 7 is a flowchart explaining the operation of the mirroring re-synchronizing function of the snapshot management program. The snapshot management program 406 copies the original data to the mirroring mate LU concerning the part wherein stored contents of the two LU's being defined as a pair for the duplication are not the same when deleting the snapshot. The mirroring re-synchronizing function of the snapshot management program 406 operates in parallel with other functions.

The snapshot management program 406 firstly checks whether registered information exists in the update location management table 407 or not when the processing of the mirroring re-synchronizing function is started. When the registered information is not in the update location management table 407, the snapshot management program 406 terminates the mirroring re-synchronizing processing (step 1001). When the registered information is in the update location management table 407, the snapshot management program 407 reads out one of the updated data held in the registered update location. This reading out is executed by an issue of the READ command of SCSI to the disk array (step 1003). When the data is returned from the disk array 410 as the response to the READ command issued at the step 1003, the snapshot management program 406 checks whether the information regarding the location of update being processed is deleted or not by referring again to the update location management table 407. Such a deletion occurs in the case where the database program updates the record at the same location immediately after the issue of the READ command (step 1004). When the information in all the update locations from where the data was read out are deleted as the result of the judgment, it means that contents of the two LU's were made to be the same owing to the update processing generated during the processing in step 1003 so that the data copying is not necessary. Therefore, in this case, the program returns to the processing in the step 1001 is returned continuing the processing of other updated data. On the other hand, the information of the update location concerning a part or all of the read out data is in the update location management table 407, these data of the update location are written back in the same location. The LU mirroring function is valid in the disk array 410 during the re-synchronizing processing, and the same data is written also onto the mirroring mate LU by means of the writing back of the data on to the original location like this, thus the contents of the both are made to be the same (step 1005). The snapshot management program 406 deletes the information on the location of the data which has been written back from the update location management table 407. Then, the processing of step 1001 is resumed and above-mentioned processing is repeated till the completion of the processing for all the information on the update locations registered in the update location management table 407 (step 1006).

In the preferred embodiment of the present invention explained above, the locations of the data necessary to be copied are recorded only in the update location management table 407 inside the computer 400. Therefore, there is a possibility of losing the location information owing to a failure of the computer 400. In this case, the stored contents can be made to be the same without losing the updated contents by means of the copying of all of the original data to the mirroring mate LU.

In the first preferred embodiment of the present invention, since the LU to which the database program accesses and the mirroring mate LU used as the snapshot of the former LU are on different disks, the load of the disk accesses by each of the backup program and the database program can be scattered. As a result, the lowering of the disk access speed by the database program during the backup can be reduced.

Also in the first preferred embodiment of the present invention, the duplication processing of the data is executed by the mirroring control program in the disk array. Therefore, the computer needs to transmit the WRITE command to the disk array only once per data writing. Load on the CPU for the I/O processing and the amount of communications through the SCSI bus can be reduced, and the execution speed of the database program can be improved compared with the duplication executed by the computer.

Further, since the disk array of the first preferred embodiment of the present invention has neither the function to manage the update location during the snapshot nor the LU re-synchronizing function to be used in the deletion of the snapshot, control of the disk array is less complicated compared with that of executing all the data duplication and the snapshot management by the external storage unit and the manufacturing cost of the disk array can be reduced.

In the above-mentioned preferred embodiment of the present invention, the processing for the re-synchronization is performed by reading out and re-writing the inconsistent data, however, this processing can be simplified further. In concrete, the mirroring control program on the disk array is provided with a function to copy the data in the designated location between the duplicated LU's. The snapshot management program on the computer issues the copying instruction to the disk array designating the location of the data instead of executing the processing of reading and writing the data. In this case, in the flowchart in FIG. 7, a step for issuing a predefined SCSI command for instructing the copying is provided instead of the processing in steps 1003 to 1005. When the mirroring control program receives this command, it copies the data in the designated location inside the disk array to the mirroring mate LU. Thus, the load on the CPU of the computer and the increase of the amount of communication through the SCSI bus owing to the data copying processing can be reduced.

Figure 8:
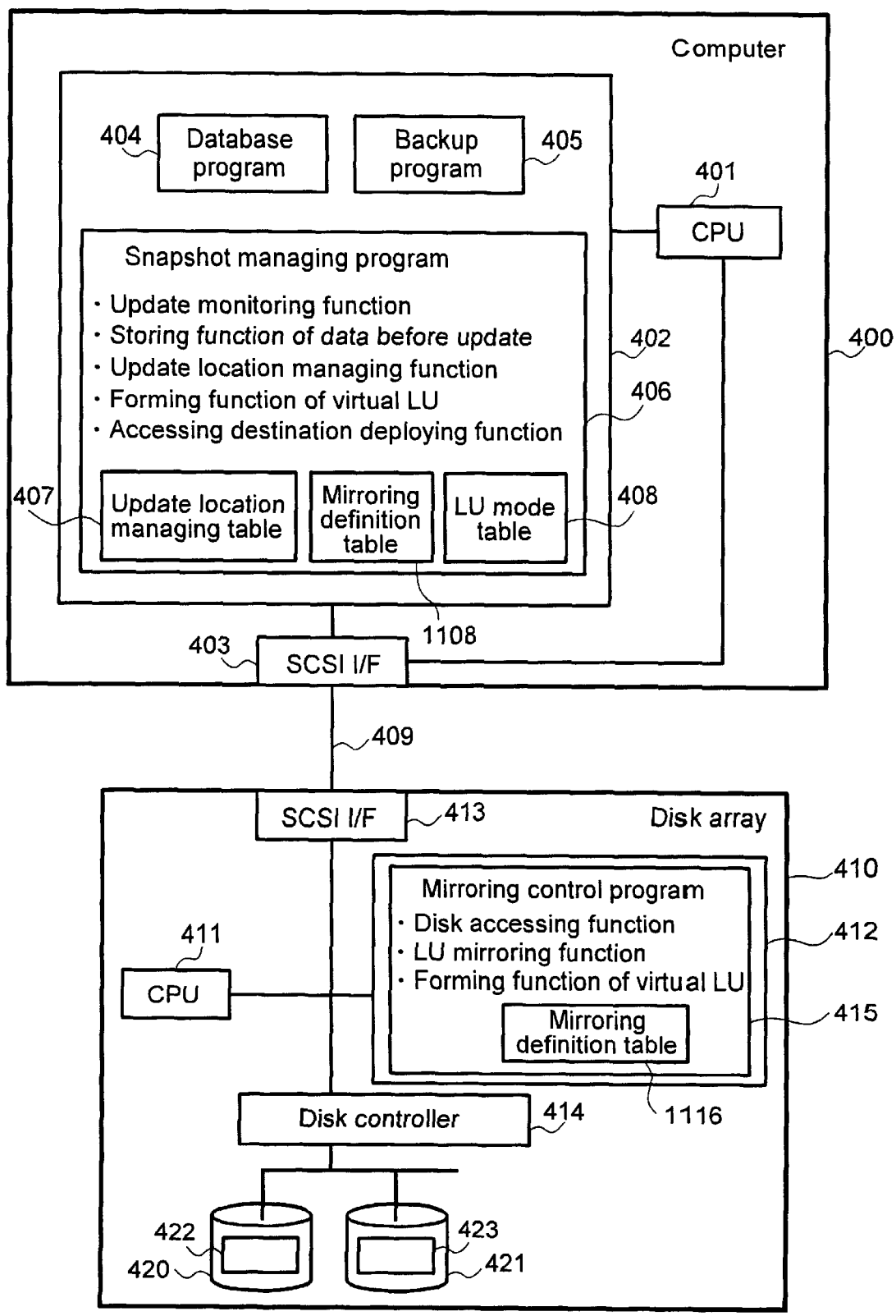
FIG. 8 is a simplified block diagram showing the configuration of the computer system of the second preferred embodiment of the present invention.

FIG. 8 is a block diagram showing the configuration of the computer system of the second preferred embodiment of the present invention. The computer system of this preferred embodiment of the present invention is different from that shown in the FIG. 1 in the points that the snapshot management program 406 inside the computer 400 is newly provided with a mirroring definition table 1108 and that the mirroring control program 412 inside the disk array 410 is provided with a mirroring definition table 1116 instead of the mirroring management table. The other configurations are basically the same with those of the first preferred embodiment of the present invention except some functions, and the components are designated with the same reference numbers as those in FIG. 1. In this preferred embodiment of the present invention, the mode management of the LU which is executed by both of the computer and the external storage unit in the first preferred embodiment is executed by the computer only and the external storage unit is made to be stateless regarding to the snapshot management.

In FIG. 8, the mirroring control program 415 of the disk array 410 has the virtual LU forming function which provides the duplicated two LU's as one LU logically. The relations among the LU's handled by the virtual LU forming function is registered in the mirroring definition table 1116. FIG. 9 is a drawing showing the form of the mirroring definition table. The mirroring definition table 1116 shows the relations among the LU's forming a group comprising three LU's which are defined as a mirroring origin LU which has the original data, the mirroring mate LU with the duplicated contents thereof and a mirroring LU which handles these as one LU logically. All the three LU's are accessible from outside. The responsibility for keeping the contents of the mirroring origin LU and the mirroring mate LU the same is placed on the snapshot management program 406 which operates on the computer 400.

The snapshot management program 406 provides the LU being provided by the disk array 410 to other program as a virtual LU. The virtual LU is accessed by other programs in the same way as a real LU. When a program accesses the virtual LU, the real LU to be accessed is switched by the snapshot management program according to the mode of the virtual LU. Here, such function is called the virtual LU forming function. The access destination and the status of the virtual LU is registered in the LU status table 408. FIG. 10 is a drawing showing the form of the LU status table used for this preferred embodiment of the present invention. The LU definition table 408 defines the READ destination LU to be accessed by the reading request designating the virtual LU and the WRITE destination LU to be accessed by the writing request designating the virtual LU corresponding to the virtual LU. As a status to be entered into the status column of the LU status table 408, there is the "Undefined" other than the statues used for the LU status table of the first preferred embodiment of the present invention. The "Undefined" indicates the status that the virtual LU is not accessible.

For the update location management table 407, which has the similar form as the update location management table of the first preferred embodiment of the present invention, information indicating the virtual LU instead of the real LU is set as the information indicating the changed LU. In this preferred embodiment of the present invention, the object LU being monitored, managed, and accessed by the update monitoring function, the update location management function, and the mirroring re-synchronizing function of the snapshot management program respectively is also the virtual LU. Each of the functions is validated or invalidated according to the mode of the virtual LU similarly as the case of the first preferred embodiment of the present invention. All the functions are invalidated for the LU in the "Undefined" mode.

The snapshot management program 406 has the mirroring definition table 1108 having the same contents as that of the mirroring definition table 1116 inside the disk array. The snapshot management program 406 issues the Mode Sense commands to all the accessible LU's at the start up and creates the mirroring definition table 1108 based on the information returned from the disk array 410 as the response to the command. The disk array 410 returns a 4-byte parameter page having the structure shown in FIG. 11 to the Mode Sense command and informs of the content of the mirroring definition table 1116 regarding each of the LU's. A page code "0" is set for the first byte at the top of the parameter page. For the second byte of the parameter page, the classification of "0" is set if the LU designated by the Mode Sense is a mirroring LU and "1" is set otherwise. When the classification is "0", the values for identifying the mirroring origin LU and the mirroring mate LU are set for the third and the fourth byte of the parameter page respectively. The snapshot management program 406 creates an entry for the LU with the classification of "0", and registers the mirroring origin LU and the mirroring mate LU when creating the mirroring definition table 1108. The mirroring definition table 1108 is not necessarily created automatically using the Mode Sense, but may be created by the snapshot management program 406 when it is started by means of reading the contents file defined by the user.

As the initial mode, the "Synchronized" is set as the mode of the virtual LU to be accessed by the database program 404, and the mirroring LU's of the mirroring definition table 1108 are set as both of the READ destination LU and the WRITE destination LU in the LU mode table 408. Besides, the "Undefined" is set as the mode of the virtual LU to be accessed by the backup program 405.

The following is the explanation of the disk access of the program on the computer in the second preferred embodiment of the present invention. The disk access from the program on the computer is executed designating the virtual LU provided by the snapshot management program 406. When the snapshot management program 406 receives the access request, it refers to the LU mode table 408, ascertains whether the mode of the designated virtual LU not the "Undefined", and rejects the access if the mode is "Undefined". Then, the snapshot management program 406 checks the designated READ destination LU and the WRITE destination LU of the designated virtual LU by referring to the LU mode table 408 and decides the real LU to be the access destination of the command to be issued. For example, in the mode shown in FIG. 10, the snapshot management program 406 issues a SCSI command targeting the LU 0 together with the reading and the writing requests regarding the access request designating the virtual LU 0. On the other hand, when receiving the access request designating the virtual LU 4, the snapshot management program 406 issues the command targeting the LU 7 in the case of the reading request and LU 6 in the case of the writing request. The snapshot management program 406 can switch the LU of the access destination LU with the virtual LU designated by each of the programs as the access destination fixed by rewriting the LU mode table.

When the mirroring control program 415 of the disk array 410 receives the access command, it executes the access to the corresponding LU referring to the mirroring definition table 1116. For example, in the case where the mirroring definition table is defined as shown in FIG. 9 when the mirroring control program 415 receives the access command targeting the LU 0, it judges the LU 0 the mirroring LU comprising the two LU's by referring to the mirroring definition table. Then, the mirroring control program 415 writes the same contents on the LU 1 and LU 2 using the LU mirroring function in the case of the update, and reads out data from either the LU 1 or LU 2 in the case of the reading out. On the other hand, the mirroring control program 415 accesses either the LU 1 or LU 2 corresponding to the access command designating the LU 1 or LU 2.

The following is the explanation of the processing for acquiring or deleting the snapshot in this preferred embodiment of the present invention. In the first preferred embodiment of the present invention, the snapshot management program managed the snapshot by issuing the Mode Select commands to the disk array when acquiring or deleting the snapshot. On the contrary, the snapshot is managed through a change of the access destination LU of the virtual LU recorded in the LU mode table 408 in this preferred embodiment of the present invention.

The mirroring LU of the mirroring definition table is set up for both of the READ destination LU and the WRITE destination LU in the LU mode table 408 before the acquisition of the snapshot. At the time of the acquisition of the snapshot, the snapshot management program 406 rewrites those with the origin mirroring LU recorded on the mirroring definition table. The snapshot management program 406 sets the READ destination LU and the WRITE destination LU corresponding to the virtual LU of the snapshot to which the backup program 405 accesses to the mirroring mate LU and sets the mode to "Snapshot". For example, consider the acquisition of the snapshot of the virtual LU 0 in the modes shown in the FIG. 9 and FIG. 10. In this case, since the snapshot management program 406 can know that the mirroring origin LU of the LU 0, which is the current access destination, is LU 1 by referring to the mirroring definition table, it rewrites the READ destination LU and the WRITE destination LU of the virtual LU 0 with the LU 1 and sets its mode to "Snapshot". The snapshot management program 406 rewrites the READ destination LU and the WRITE destination LU of the virtual LU 1 to be accessed as the snapshot of the virtual LU 0 with the LU 2 which is the mirroring mate LU of the LU 0 and sets its mode to "Snapshot". With the above, an access to the virtual LU 1 is enabled. Because the update of the virtual LUs 0 and 1 cannot be duplicated each other, each of the virtual LU's becomes able to be utilized for the access to the original data and the snapshot.

When deleting the snapshot, the snapshot management program 406 changes the mode of the virtual LU of the snapshot set in the LU mode table 408 to "Undefined" and that of the virtual LU of the original data to "Re-synchronized". The WRITE destination LU of the virtual LU of the original data is changed to the mirroring LU which is registered in the mirroring definition table. For example, when deleting the virtual LU 3 which is the snapshot of the virtual LU 2 in the mode shown in FIG. 9 and FIG. 10, the snapshot management program 406 sets the mode of the virtual LU 3 to "Undefined". Since it can be known that the mirroring LU of the LU 4 which is the current WRITE destination LU of the virtual LU 2 is LU 3 through the reference to the mirroring definition table, the snapshot management program 406 rewrites the WRITE destination LU from the LU 4 to the LU 3 and sets its mode to "Re-synchronized". Through the above, the access from the program to the virtual LU 3 which is the snapshot becomes impossible. When performing the data copying processing for making the contents of the mirroring origin LU and the mirroring mate LU the same, each access destination is the mirroring origin LU for the reading out from the virtual LU of the original data or the mirroring LU for the writing back of the original data onto the virtual LU. After the completion of the data copying processing, the snapshot management program 406 changes the READ destination LU of the virtual LU to be accessed as the original data to the original mirroring LU. To complete the deletion of the snapshot of the virtual LU 4 in the "Re-synchronized" mode, the snapshot management program 406 changes the READ destination LU to LU 6 knowing that the mirroring LU of the LU 7 which is the READ destination LU is the LU 6 from the mirroring definition table, and set its mode to "Synchronized". Thus, the deletion of the snapshot is completed.

According to the second preferred embodiment of the present invention, the recovery processing against a failure can be simplified by a transformation of the external storage unit to stateless mode. For example, if the computer fails at the moment the mode of the LU is changed in the first preferred embodiment of the present invention, the mode of each LU recorded in the LU mode table of the computer must agree with that recorded in the mirroring management table of the disk array in the recovery processing. However, in the second embodiment of the present invention, since the disk array is stateless, the processing can be preferred taking only the mode of the computer in consideration.

Figure 12:
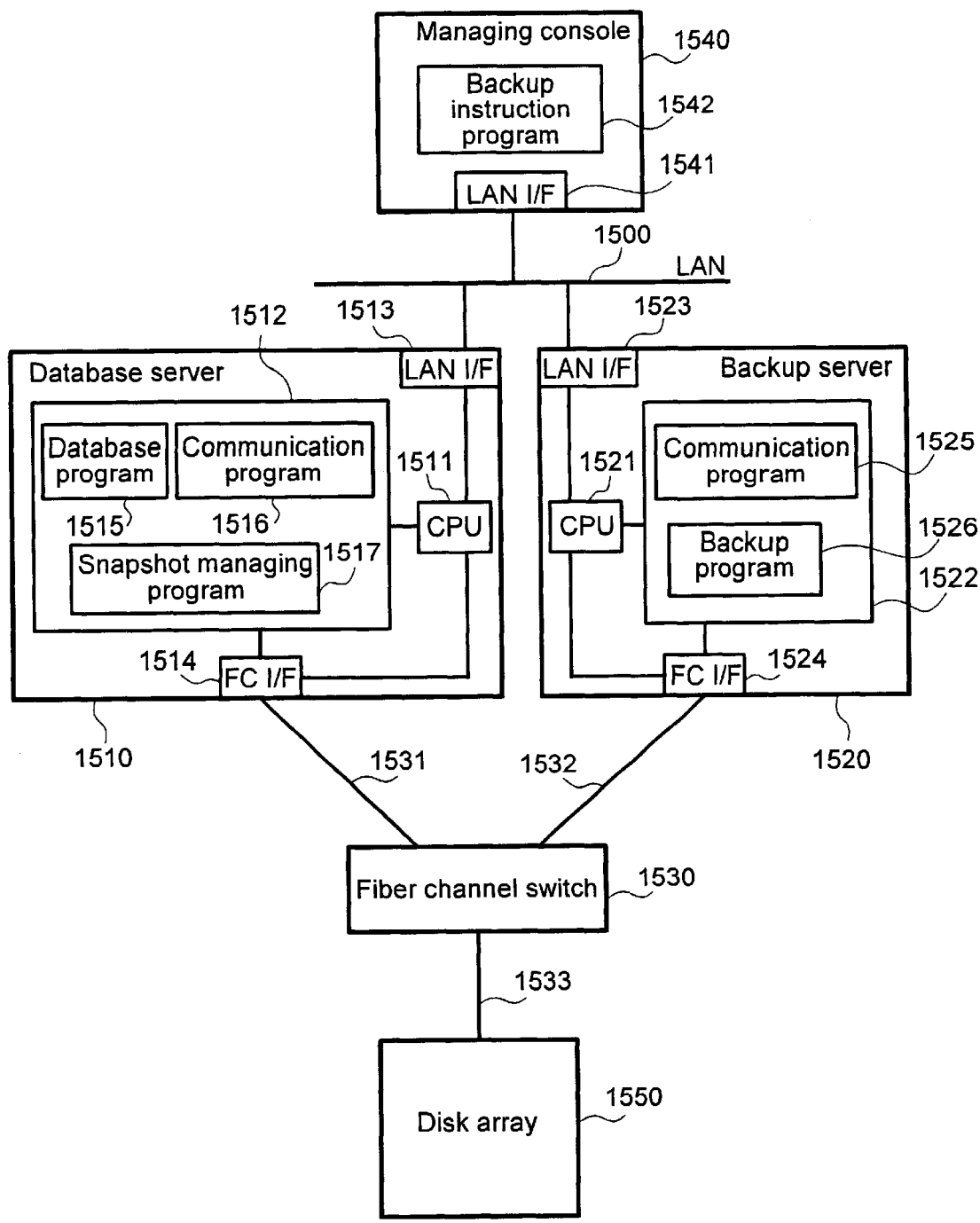
FIG. 12 is a simplified block diagram showing the configuration of the computer system of the third preferred embodiment of the present invention.

FIG. 12 is a block diagram showing the configuration of the computer system of the third preferred embodiment of the present invention. In this preferred embodiment of the present invention, each of the database program and the backup program runs on a different computer. In FIG. 12, a database server 1510 is a computer on which a database program 1515 which performs database management runs and a backup server 1520 is a computer on which a backup program 1526 runs. The database server 1510 and the backup server 1520 are connected mutually via a LAN (Local Area Network) 1500. The disk array 1550 which stores the database is shared by the database server 1510 and the backup server 1520. Among each of the servers and the disk array 1550 are connected via the Storage Area Network (SAN) comprising a fiber channel switch 1530 and fibrae channel cables 1531, 1532, and 1533. A LAN 1500 is connected with a management console 1540 which is a computer on which a backup instruction program 1542 for instructing the start and stop of the backup runs via a LAN interface 1541.

The database server 1510 has a CPU 1511, a memory 1512, an LAN interface 1513 for connecting with the LAN 1500 and a fiber channel interface 1514 for connecting with the SAN. In the memory 1512, a communication program 1511 and a snapshot management program 1517 are installed together with the database program 1515. The database program 1515 and the snapshot management program 1517 execute processings similar to those of the programs of the preferred embodiment of the present invention explained above. The communication program 1516 receives the instruction concerning a backup processing and calls the database program or the snapshot management program according to the contents thereof by communicating with the management console 1540 via the LAN 1500.

The backup server 1520 has a CPU 1521, a memory 1522, a LAN interface 1523, and a fiber channel interface 1524. In the memory 1522, a communication program 1525 which calls a backup program 1526 based on the instruction from the management console 1540 is installed together with the backup program 1526. The backup program 1526 accesses the disk array 1550 designating a real LU provided by the disk array 1550. The functions of the disk array are the same as those of the second preferred embodiment of the present invention except that the communication is replaced with a SCSI protocol defined on the fiber channel.

The acquisition processing of the backup utilizing the snapshot management of this preferred embodiment of the present invention is performed in the following procedure. When the backup instructing program 1542 of the management console 1540 receives the instruction to acquire the backup from the user, it instructs the communication program 1516 of the database server 1510 to acquire the snapshot. When the communication program 1516 receives the instruction, it instructs the database program 1515 to suspend the update operation temporarily and instructs the snapshot management program 1517 to acquire the snapshot. The acquisition of the snapshot is done by the snapshot management program 1517 in the same way as that of the second preferred embodiment of the present invention. After acquiring the snapshot, the communication program 1516 instructs the database program to restart the update of the database and reports the completion of the acquisition of the snapshot to the backup instructing program 1542.

When receiving the report of the completion of the snapshot acquisition, the backup instructing program 1542 instructs the communication program 1525 of the backup server 1520 to start the backup. When the communication program 1525 receives the instruction, it instructs the backup program 1526 to start the backup and makes it execute the backup. After completing the backup, the communication program 1526 reports the completion of the backup to the backup instructing program 1542.

When receiving the report of the backup completion, the backup instructing program 1542 instructs the communication program 1516 to delete the snapshot. When receiving the instruction, the communication program 1516 instructs the snapshot management program 1517 to delete the snapshot. After deleting the snapshot, the communication program 1516 reports the completion of the snapshot deletion to the backup instructing program 1542. Through the above processings, the online backup of the database is completed.

With the third preferred embodiment of the present invention, the load on the CPU of the database server during the backup can be reduced in addition to the effect obtained by the second preferred embodiment of the present invention. In the second preferred embodiment of the present invention, both the backup program and the database program run on the same computer. Therefore, owing to the increase of the load on the CPU caused by the data transferring processing during the backup, the execution speed of the database program is feared to be slowed down. Whereas, in the third preferred embodiment of the present invention, the backup program runs on a computer other than that for the database server so that the slowing down of the execution speed of the database program during the backup is prevented because the load of the data transfer processing does not affect the load of the CPU of the database server. With the third preferred embodiment of the present invention, quick backup can be realized by virtue of the high-speed data transfer because of the connection between the backup server and the disk array with the fiber channel.

Figure 13:
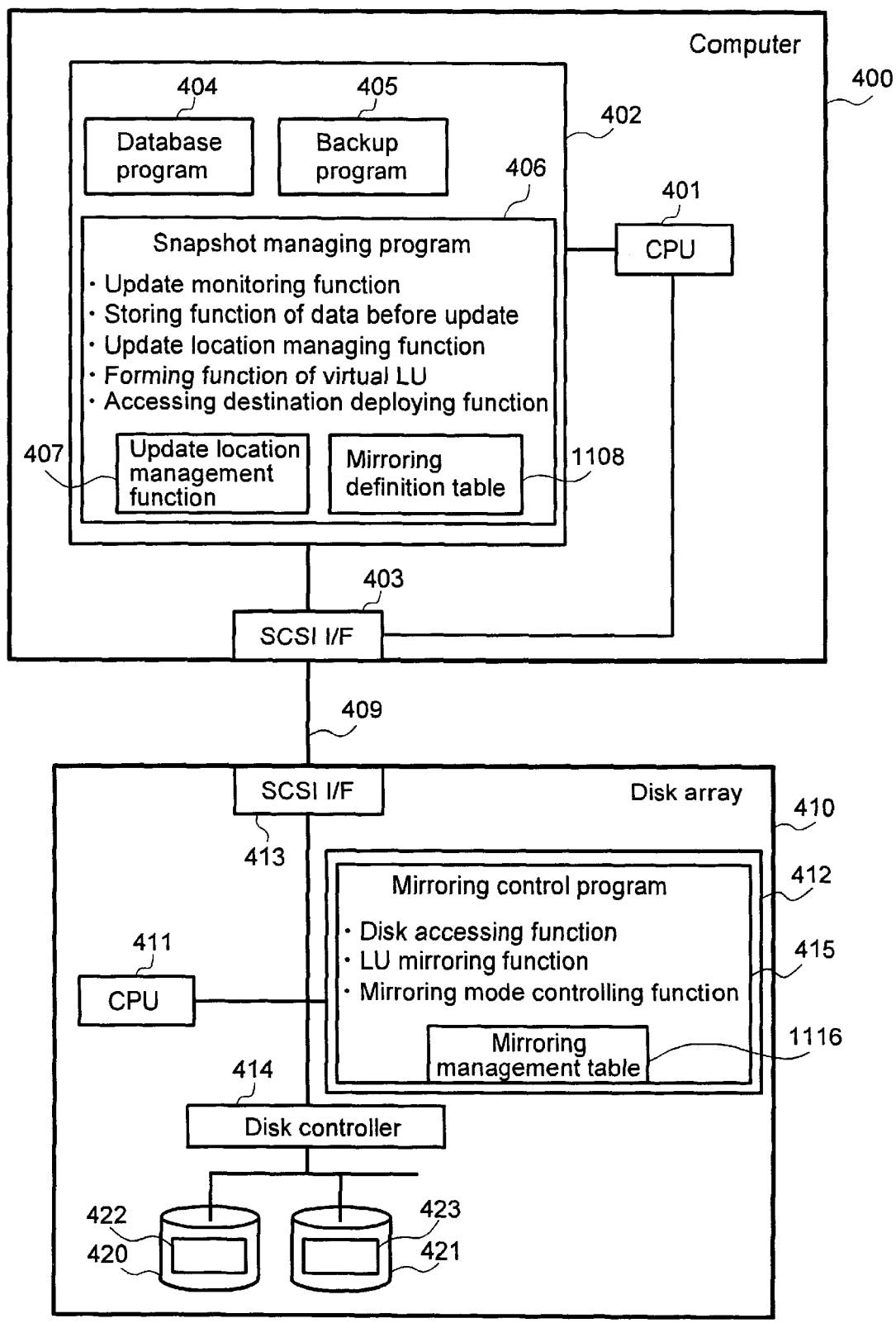
FIG. 13 is a simplified block diagram showing the configuration of the fourth preferred embodiment of the present invention.

FIG. 13 is a block diagram showing the configuration of a computer system of the fourth preferred embodiment of the present invention. This preferred embodiment of the present invention makes the substantial change of the conventional snapshot management program unnecessary when shifting the method of snapshot management from that by means of storing the pre-update data explained as a prior art to that by means of the above explained first or second preferred embodiment of the present invention. For this purpose, in this preferred embodiment of the present invention, the original data is stored in a mirroring LU in which the stored contents are duplicated on the two different memory media, and the original data is updated after the pre-update data is stored in another area when the update is requested after the time point when the snapshot has been acquired. The snapshot is represented as a virtual LU by the snapshot management program, but the part not updated is accessed referring to the original data and the updated part is accessed referring to the pre-update data stored in another area. The basic operation of the snapshot management program of this preferred embodiment in the present invention is similar to that used in the method for managing the snapshot of the prior art by means of storing the pre-update data, however, the function of distributing the access destinations, which will be explained later, is added for cooperation with the disk array supporting function.

The configuration of the hardware of the computer system shown in FIG. 13 and the functions of the database program and backup program are similar to those of the first and second preferred embodiment of the present invention explained above. The mirroring control program 415 which operates inside the disk array 410 has the mirroring definition table 1116 which defines the relations among LU's similarly to the second preferred embodiment of the present invention. FIG. 14 is a drawing showing the form of the mirroring definition table of this preferred embodiment of the present invention. The mirroring definition table 116 defines only the relation of correspondence between the mirroring LU and the mirroring mate LU different from the mirroring definition table of the second preferred embodiment of the present invention. The mirroring LU is the duplicated two LU's represented as a virtual LU similarly to that of the second preferred embodiment of the present invention and the mirroring mate LU is one of the two LU's comprising the mirroring LU. In the mirroring definition table 1116 shown in FIG. 14, the LU 0 is duplicated to the LU 1, for example. When the mirroring control program 415 receives the access command to the LU 0, it reads the data from either of the LU 0 or the LU 1 when the command is the reading request or writes the same contents to both of the LU 0 and the LU 1 when the command is the writing request. The access to the LU 1 which is the mirroring mate LU is limited only to the LU 1 and the LU 0 cannot be accessed. The LU which is registered as a mirroring mate LU in the mirroring definition table 1116 is a read only LU and the writing request to the mirroring mate LU is rejected by the mirroring control program 415. Through the above, the contents of the mirroring origin LU and the mirroring mate LU are always made to be the same. The contents of the data read from the mirroring LU and those read from the mirroring mate LU are the same, but when the mirroring mate LU is accessed, the access destination LU is limited to one LU. Application programs such as the database program 404 on the computer always access the mirroring LU. The mirroring mate LU is provided for the access destination allocation function of the snapshot management program 406 to be explained later.

The snapshot management program 406 is provided with the function of allocating a part of the access commands issued to the mirroring LU to the mirroring mate LU to refer to the original data. The mirroring mate LU corresponding to the mirroring LU of the original data is obtained through the reference to the mirroring definition table 1108. The mirroring definition table 1108 has the same contents as those of the mirroring definition table 1116 inside the disk array 410. The mirroring definition table 1108 is created from data acquired by the snapshot management program 406 from the disk array 410 with the Mode Sense, or by a manual setting of the users.

The following is the explanation of the access destination allocation function of the snapshot management program 406. Access to the original data are classified into two kinds. One is the access from the database program 404 to the original data. The other is the access from the backup program 405 to the snapshot and it is the access in case the data of the access destination has not been updated after the time point of the acquisition of the snapshot. In this case, the snapshot shares the memory area with the original data, so that the accessing destination is the original data. According to the prior art, both of those kinds of access are done to the mirroring LU being provided for the access to the original data, but in this preferred embodiment of the present invention, the accessing destination of the latter is changed to the mirroring mate LU by the snapshot management program 406. Thus, the access destinations of all the read requests to the original data generated from the backup program 405 are limited to the mirroring mate LU. Therefore, the access is loaded only on the magnetic disks to which the mirroring mate LU is allocated.

On the other hand, the access destination of the read requests generated by the database program 404 is the mirroring LU, and either of the duplicated two LU's can be used. Therefore, by using the disk bearing lighter load as the access destination for the reading request, the disk access speed of the database program is not lowered even when the load of the reading out, which is generated from the backup program, of the original data is heavy. For example, in the mirroring definition table 1108 shown in FIG. 14, the LU 0 and LU 1 are assumed to be allocated to the disk units 420 and 421 shown in FIG. 13 respectively. In this case, when the snapshot of the LU 0 is acquired, all the access requests from the backup program to the original data are issued to the LU 1 and only the disk unit 421 is used. Since the access requests issued by the database program 404 are pointed at the LU 0, both of the disk unit 420 and 421 can be used. Therefore, if the mirroring control program 415 selects the disk unit 420 bearing lighter load as the access destination, the disk reading out performance of the database program will not be deteriorated even when the disk access load caused by the backup is heavy.

The fourth preferred embodiment of the present invention can be realized by only adding the function to allocate the access destinations to the snapshot management program of the prior art and the period required for the development of the snapshot management program can be shortened.

According to each of the preferred embodiments of the present invention explained above, since the storage area used for the access to the original data and that used for the access to the snapshot are on the different memory media, the concentration of the load on a specific medium during the backup can be avoided. Besides, the backup processing can be executed on a computer other than that for online processings, and thus the increase of the load on the CPU during the backup processing can be lessened. Further, since the duplication of the data writing is executed by the external storage unit, the additional load on the CPU or the amount of the data communication caused by the duplication process of the data writing are not generated. The external storage unit has neither the function for managing the update locations during the acquisition of the snapshot nor the function for assuring the consistency of the duplicated storage contents when the snapshot is deleted. Therefore, the cost of the external storage unit can be reduced and inexpensive computer system can be constructed.

The preceding has been a description of the preferred embodiment of the invention. It will be appreciated that deviations and modifications can be made without departing from the scope of the invention, which is defined by the appended claims.

What is claimed is:

1. A method of managing snapshot information in a computer system including a computer and a storage system coupled to the computer, the storage system having a disk controller and at least a first storage unit and a second storage unit connected to the disk controller, the method comprising:

setting the storage system in a mode to be synchronized; and maintaining duplicate data in the first storage unit and the second storage unit;

using the disk controller, writing data to both the first storage unit and the second storage units;

setting the storage system in a mode for acquiring a snapshot using data in the second storage unit;

using the disk controller, writing data to the first storage unit;

maintaining as differential information, storage locations of data to be updated according to each write request;

setting the storage system in a mode for being resynchronized;

copying data stored in the storage locations maintained as differential information from the first storage unit to the second storage unit; thereby assuring that the first storage unit and the second storage unit have duplicate data.

2. The method according to claim 1 wherein the computer system further includes a storage device for storing backup data, and the method further comprises:

transferring data from the second storage unit to the storage device when the storage system is to acquire the snapshot;

wherein the copying step is performed after the completion of the step of transferring data.

3. The method according to claim 2 wherein the step of transferring is performed by a further computer to which the storage system is coupled.

4. The method according to claim 1 further comprising while the storage system is in the mode of being resynchronized, a step of writing, by the storage system, the write data into both of the first storage unit and the second storage units according to the write request designating the first storage unit.

5. The method according to claim 1, wherein the copying step comprises:

acquiring, by the computer, the location of the data being updated according to the write request issued after the acquisition request of the snapshot based on the differential information and reading out the data stored in the location from the storage system;

requesting, by the computer, the storage system to write the data read out based on the differential information;

reading data stored in the acquired location in the first storage unit; and storing, in response to the request, the data read out based on the differential information in the second storage unit by the storage system.

6. The method according to claim 1, wherein the conforming step comprises:

acquiring, based on the differential information, the location of data which has been updated by the write request issued after the acquisition request of snapshot;

requesting the storage system to copy the data designating the acquired location of the data; and copying, by the storage system, the data in the location designated by the request from the first storage unit to the second storage unit.

7. The method according to claim 1, wherein the copying step includes a step of setting the mode in which the access designating the second storage unit is prohibited in response to the instruction.

8. The method according to claim 1, further comprising a step of setting a mode of the second storage unit to prohibit writing write data into the second storage unit in response to the request for acquiring the snapshot.

9. A computer system comprising:

a computer; and a storage system coupled to the computer, the storage system including a first storage unit, a second storage unit, and a control unit controlling the first and the second storage units, where the control unit writes data accompanying a write request into both of the first and second storage units in accordance with the write request, when the control unit is set in the synchronized mode, and prohibits writing data to the second storage unit when it is set in a snapshot mode; and the computer selectively sets a operation mode including a synchronized mode and a snapshot mode to the storage system, and maintains the differential information indicating data writing location according to the writing request when the data writing request is issued to the storage system while the storage system is in a snapshot mode.

10. The computer system according to claim 9, wherein the operating mode further includes a re-synchronized mode for making the first storage unit and the second storage unit store corresponding data, and the control unit prohibits the read out processing from the second storage unit when it is set in the re-synchronized mode by the computer.

11. A computer system according to claim 10, wherein the computer acquires a storage location in the first storage unit to which data was written according to the differential information when the storage system was in the snapshot mode, and the computer reads out the data from the acquired storage location in the first storage unit, and issues a write request to write the read out data into the second storage unit.

12. A computer system according to claim 10, wherein the computer acquires, based on the differential information, the storage location in the first storage unit to which data was written when the storage system was in the snapshot mode, and instructs the storage system to copy data held in the storage location, and wherein the control unit copies the data held in the storage location in the first storage unit to the second storage unit in response to the copying instruction.

13. A computer system according to claim 10, wherein the control unit rejects read requests designating the second storage unit when it is set in the re-synchronized mode.

14. A computer system according to claim 9, wherein the control unit rejects write requests designating the second storage unit when it is set in the snapshot mode.

15. A computer system according to claim 9, further having a storage device for storing backup data and wherein the computer copies the contents of the second storage unit to the storage device for backup when the storage system is in the snapshot mode.

16. A computer system according to claim 9, further comprising:

a storage device for storing backup data; and a backup computer coupled to the computer, wherein the backup computer receives a notification that the storage system is in the snapshot mode from the computer and copies the data held in the second storage unit to the storage device in response to the notification.

17. A computer system, comprising:

a storage system including a first storage unit, a second storage unit, and a control unit controlling the first and the second storage units; and a computer having:

means for selectively setting an operating mode, which includes a synchronized mode and a snapshot mode, to the storage system, means for receiving write requests to the storage subsystem issued by an application program running on the computer, means for issuing a write request with designating a first identifier discriminating a pair of the first and the second storage units to the storage system when the storage system is set in the synchronized mode by the setting means, and for issuing a write request designating a second identifier discriminating the first storage unit to the storage system when the storage system is set in the snapshot mode, and means for acquiring and holding differential information indicating location in first storage unit designated by write request designating the first identifier.

18. A computer system according to claim 17, wherein the control unit writes data accompanying the writing request on both of the first and the second storage units in response to the write request designating the first identifier.

19. A computer system according to claim 18, wherein the operation mode includes the re-synchronized mode which makes the contents of the first storage unit and the second storage unit the same, and the issuing means issues the write request designating the first identifier in obedience to write request from a program which runs on the computer when the storage system is in the re-synchronized mode.

20. A method of managing snapshot information in a computer system including a computer and a storage system coupled to the computer, the storage system having operation modes and including a disk controller and a first and a second storage unit each of which is coupled to the disk controller, the method comprising:

logically defining the first and the second storage units as one mirrored storage unit, and the storage system, writing write data to both of the first and the second storage units according to the write request from the computer: and if the operation mode is snapshot mode, issuing the write request from the computer to the storage system with the target of the write request being the first storage unit, in the storage system, writing data to the first storage unit according to the write request from the computer, and in the computer, holding the storage location of data updated according to the write request.

21. The method of claim 20, wherein if the operation mode is snapshot mode, before writing data to the first storage unit, copying data stored in a storage area to be updated to another storage area in the storage system, and holding the storage location of the data stored in the another storage area, and further comprising the steps of issuing the read request to read snapshot data from the computer to the storage system;

reading data from one of the first or the second storage unit if the target data of the read request is stored in both of the first and the second storage unit; and reading data from the another storage area if the target data of the read request is updated in the first storage unit and copied to the another storage area.

22. The method of claim 20 wherein the computer includes a mode table defining the correlation among the operation mode, the target storage unit of an access request issued from the computer to the storage system, and a virtual storage unit which is the access target of a program executed in the computer, and further comprising the steps of holding the information showing the mirror storage unit as the target storage unit in the mode table, if the operation mode is synchronized mode; and changing the target storage unit to one of the first or the second storage unit and updating the mode table, when the operation mode is changed from synchronized mode to snapshot mode.

23. The method of claim 20 wherein the operation mode is changed by updating the mode table in the computer.

* * * * *